US009789520B2

(12) United States Patent
Uppili (10) Patent No.: US 9,789,520 B2
(45) Date of Patent: Oct. 17, 2017

(54) METHOD FOR CLEANING POROUS METALLIC FILTERS USING A STEAM-ULTRASONIC TECHNIQUE

(75) Inventor: Sundararajan Uppili, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 469 days.

(21) Appl. No.: 13/160,220

(22) Filed: Jun. 14, 2011

(65) Prior Publication Data

US 2011/0308543 A1 Dec. 22, 2011

Related U.S. Application Data

(60) Provisional application No. 61/357,256, filed on Jun. 22, 2010.

(51) Int. Cl.
| | | |
|---|---|---|
| *B08B 3/12* | (2006.01) | |
| *B08B 3/00* | (2006.01) | |
| *B08B 3/02* | (2006.01) | |
| *B08B 3/08* | (2006.01) | |
| *B01D 41/00* | (2006.01) | |
| *B08B 7/02* | (2006.01) | |
| *B01D 41/04* | (2006.01) | |

(52) U.S. Cl.
CPC ............... *B08B 3/12* (2013.01); *B01D 41/00* (2013.01); *B01D 41/04* (2013.01); *B08B 3/00* (2013.01); *B08B 3/02* (2013.01); *B08B 3/08* (2013.01); *B08B 7/028* (2013.01); *B08B 2230/01* (2013.01)

(58) Field of Classification Search
CPC .. B08B 3/00; B08B 3/02; B08B 3/028; B08B 3/12; B08B 7/028; B08B 3/08; B08B 2230/01; B01D 41/00; B01D 41/02; B01D 41/04
USPC ...... 134/22.16, 22.17, 22.18, 26, 28, 29, 30, 134/31, 37; 210/791, 797, 798, 749
See application file for complete search history.

(56) References Cited

U.S. PATENT DOCUMENTS

| | | | | |
|---|---|---|---|---|
| 4,256,470 A | * | 3/1981 | Zajicek | ............. B01D 19/0031 210/323.2 |
| 5,135,380 A | * | 8/1992 | Akatsu | .................... B29B 13/06 425/203 |
| 5,240,613 A | | 8/1993 | Tsuchitani et al. | |
| 5,372,653 A | | 12/1994 | Gray | |
| 5,487,836 A | * | 1/1996 | Mason et al. | ................. 210/791 |

(Continued)

FOREIGN PATENT DOCUMENTS

| | | | |
|---|---|---|---|
| DE | 10349842 | * | 5/2005 |
| DE | 102006056752 | * | 6/2008 |

(Continued)

OTHER PUBLICATIONS

PCT Notification of Transmittal of the International Search Report and the Written Opinion of the International Searching Authority, or the Declaration, International Application No. PCT/US2011/040520, dated Aug. 9, 2011, 11 pages.

*Primary Examiner* — Saeed T Chaudhry
(74) *Attorney, Agent, or Firm* — Phillips 66 Company (57) ABSTRACT

A method of cleaning plugged or dirty porous metallic filter elements to regain filter activity, comprising the steps of: steaming a filter element for a first period of time; submerging the filter element in a first solution; and exposing the first solution to ultrasound waves for a second period of time.

4 Claims, 11 Drawing Sheets

(56) References Cited

U.S. PATENT DOCUMENTS

| | | | |
|---|---|---|---|
| 5,925,056 A * | 7/1999 | Thomas | A61B 17/1615 606/170 |
| 6,821,444 B2 | 11/2004 | Benenson, Jr. et al. | |
| 7,008,540 B1 | 3/2006 | Weavers et al. | |
| 7,229,562 B2 | 6/2007 | Crandall et al. | |
| 2011/0108483 A1* | 5/2011 | Kaas | 210/650 |

FOREIGN PATENT DOCUMENTS

| | | |
|---|---|---|
| GB | 2292098 | 2/1996 |
| WO | 9314181 | 7/1993 |

\* cited by examiner

METHOD FOR CLEANING POROUS METALLIC FILTERS USING A STEAM-ULTRASONIC TECHNIQUE

CROSS-REFERENCE TO RELATED APPLICATIONS

This application is a non-provisional application which claims the benefit of and priority to U.S. Provisional Application Ser. No. 61/357,256 filed Jun. 22, 2010, entitled "Method for Cleaning Porous Metallic Filters Using a Steam-Ultrasonic Technique," which is hereby incorporated by reference in its entirety.

STATEMENT REGARDING FEDERALLY SPONSORED RESEARCH OR DEVELOPMENT

None

FIELD OF THE INVENTION

A method of cleaning porous metallic filters using a combined steam-ultrasonic technique.

BACKGROUND OF THE INVENTION

Porous metallic filter assemblies are commonly used in refining technologies to remove solid particles (e.g., catalyst or sorbent particles) from liquid or gaseous hydrocarbon streams. These filter assemblies generally consist of a circular tube sheet comprising about 60-150 filter cartridges attached thereto in a precise pattern.

Over time, the filter cartridges can become plugged due to the accumulation of fine solid particles in the filter pores. Additionally, some refining technologies expose the filters to harsh environments which can cause the filter cartridges to undergo physical and/or chemical transformations. The accumulation of particulate and physical/chemical transformations eventually cause a high pressure drop across the filter assembly, such that the filters can no longer be used effectively. The extent to which the filter is plugged and/or transformed is measured as a differential pressure across the filter bundle such that, when the differential pressure reaches a threshold value (i.e., high alarm), the plugged or dirty filter is removed from the tubesheet. Upon removal, the plugged or dirty filter is either replaced with a new filter or, preferably, cleaned and reused. Replacing plugged or dirty filters presents a serious financial burden due to the high cost of new filters and other costs associated with replacing the filters; therefore, it is preferable to clean and reuse the filters.

However, many conventional cleaning methods cannot remove enough of the solid particles to sufficiently reduce the pressure drop across the filter assembly. Further, these cleaning methods typically require use of harsh chemicals (e.g., acids, bases) and/or conditions that corrode the filter material or otherwise damage the filters. One such method is a vendor based procedure that cleans porous stainless steel filters with 10-25% nitric acid, 10-25% sodium hydroxide at 50 to 75° C. See U.S. Pat. No. 4,493,756. Additionally, some sintered filter materials absorb carbon while in certain hydrocarbon service and become sensitized causing carbide precipitation and chromium depletion in the filter grain boundaries which are susceptible to intergranular attack (i.e., corrosion) by strong acids such as nitric acid. Such corrosion causes the filters to fail (e.g., crack) prematurely.

The cost of such filter assemblies is about $1 million, and the cost of replacing the filter cartridges is about $0.2 to 0.5 million. Accordingly, it is highly desirable to clean plugged or dirty filter cartridges without damaging the filters, and to replace plugged or dirty filters with cleaned filters whenever possible to reduce maintenance costs.

Accordingly, a non-destructive method of cleaning is needed to clean plugged or dirty filter cartridges without corroding or otherwise damaging the filters.

SUMMARY OF THE INVENTION

A method of cleaning plugged or dirty porous metallic filter elements to regain filter activity, comprising the steps of: steaming a filter element for a first period of time; submerging the filter element in a first solution; and exposing the first solution to ultrasound waves for a second period of time.

BRIEF DESCRIPTION OF THE DRAWINGS

For a further understanding of the nature and objects of the present inventions, reference should be made to the following detailed disclosure, taken in conjunction with the accompanying drawings, in which like parts are given like reference numerals, and wherein.

DETAILED DESCRIPTION OF PREFERRED EMBODIMENTS OF THE INVENTION

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

A method for cleaning plugged or dirty, porous metallic filters using steam ultra-sonic techniques is described below. The plugged or dirty, porous metallic filters can be a result from liquid or gaseous hydrocarbon streams. The steam ultra-sonic techniques restore a high percentage of the filters' activity without damaging the filter material. In one embodiment the cleaned filter element regains about 90% of its original activity, in another embodiment the cleaned filter element regains about 84% of its original activity.

An initial step in the combined steam-ultrasonication method involves steam-cleaning, or steaming, the plugged or dirty filters. It is possible to both clean an entire filter bundle or to remove the filter cartridges and clean them individually, duos or as triads (i.e., sets of two or three filter cartridges). Applicant defines "filter element" to comprise filter coupons, filter cartridges, and any other filter configuration.

Figure 1A:
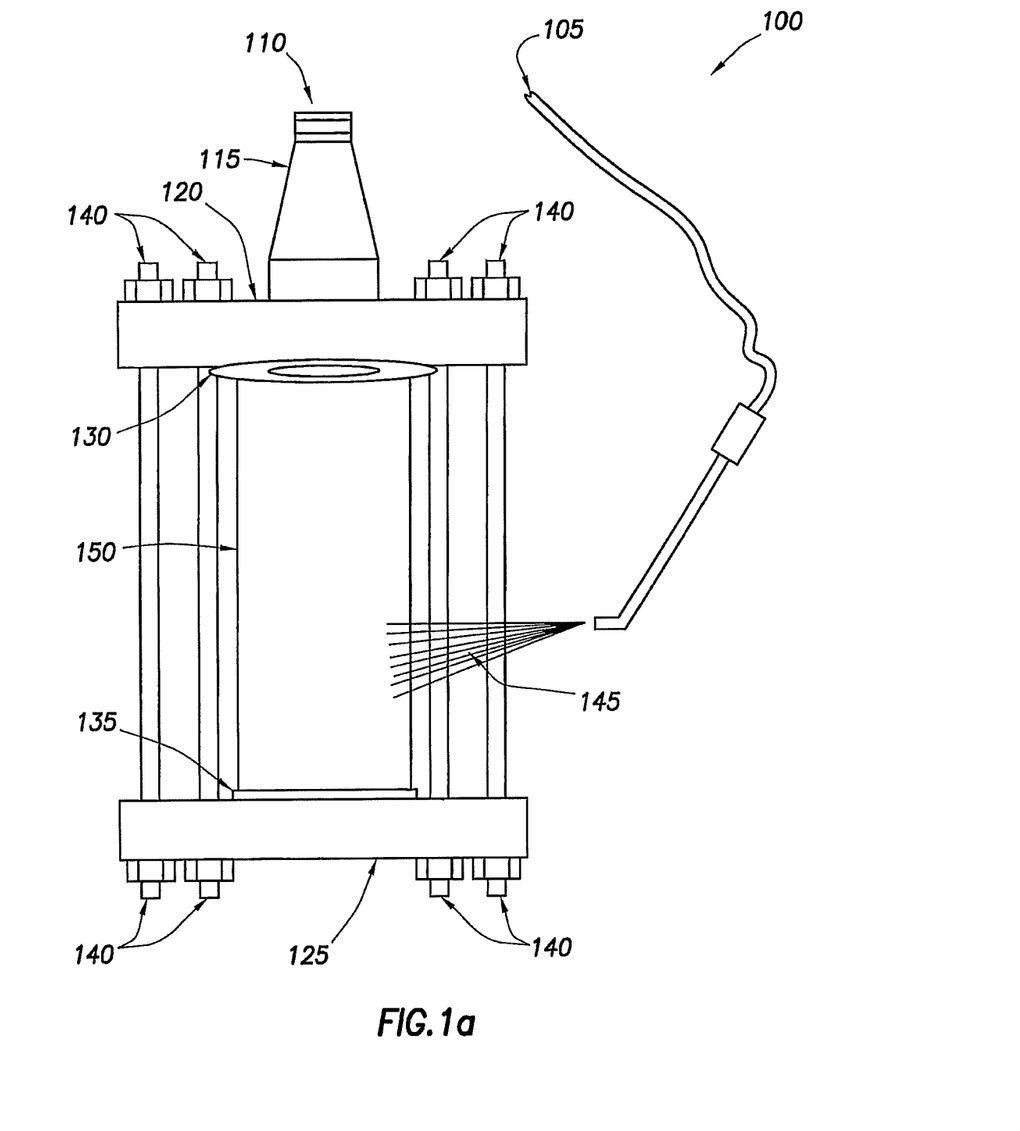
FIG. 1a is an illustrative steam blast and/or backflush setup for steam-cleaning, and/or steam backflushing a filter coupon.
Figure 1B:
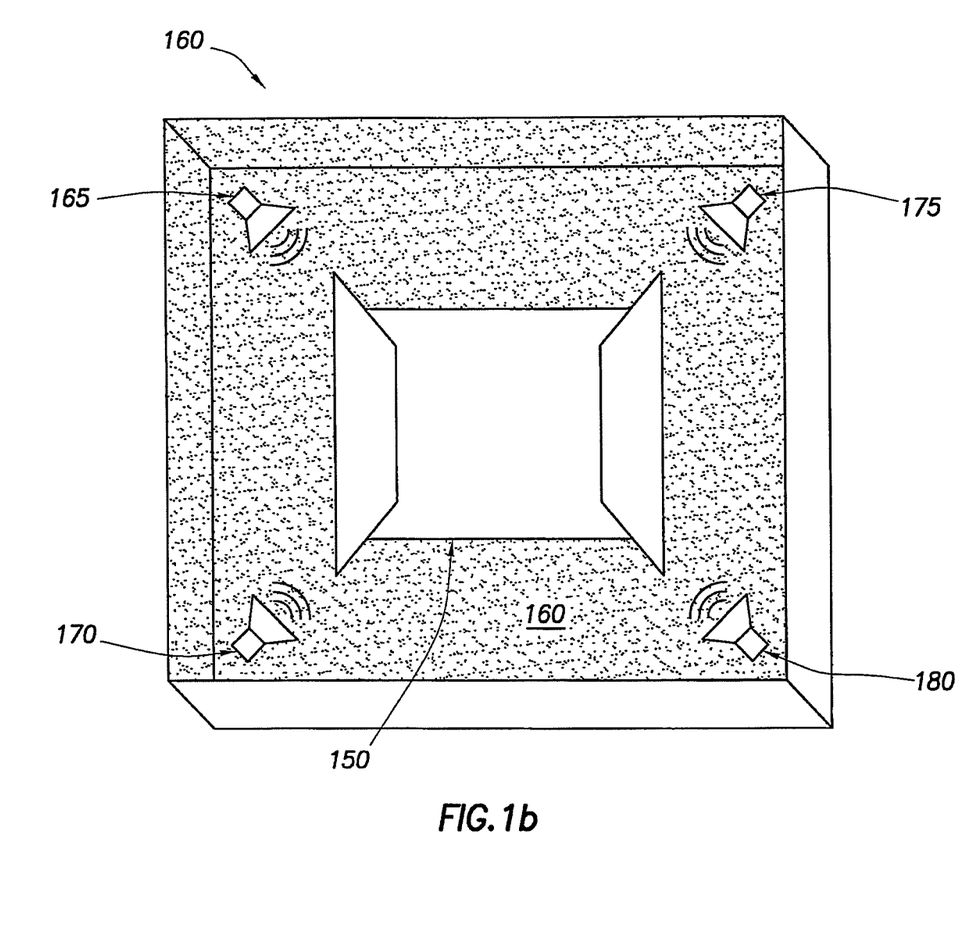
FIG. 1b is an illustrative ultrasonic bath for ultrasonicating a filter coupon.

An apparatus for cleaning plugged or dirty filter coupons using a steam-ultrasonic technique is shown in FIGS. 1a and 1b. As shown in FIG. 1a, a filter coupon 150 is clamped into the apparatus for steam-ultrasonic techniques 100 for steam cleaning the filter coupons 150. The apparatus for steam-ultrasonic techniques comprises an upper plate 120 and a lower plate 125, and a plurality of tightening rods 140 to clamp a filter coupon 150 between the upper plate 120 and lower plate 125. An upper gasket 130 forms a seal between the upper plate 120 and the upper end of the filter coupon 150. Similarly, a lower gasket 135 forms a seal between the lower plate 125 and the lower end of the filter coupon 150. The steam backflush setup 110 are connected to the steam backflush adapter 115. Steam and condensate 145 are sprayed out of the steam blast setup 105.

Figure 2A:
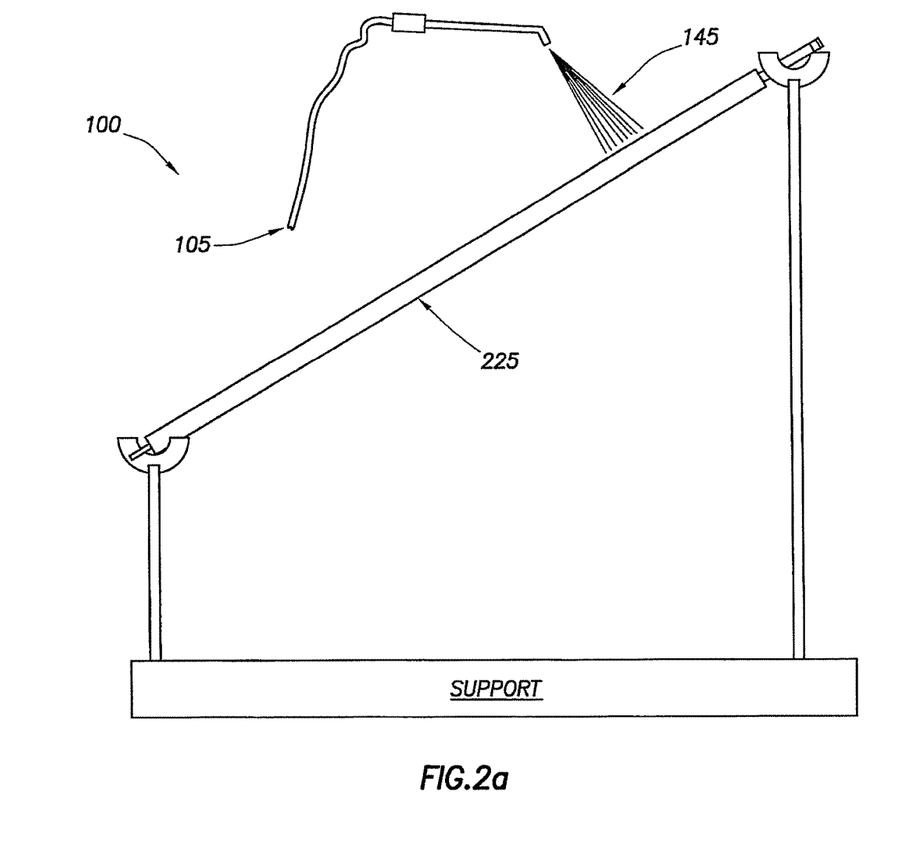
FIG. 2a is an illustrative steam blast and/or backflush setup for steam-cleaning, and/or steam backflushing a filter cartridge.
Figure 2B:
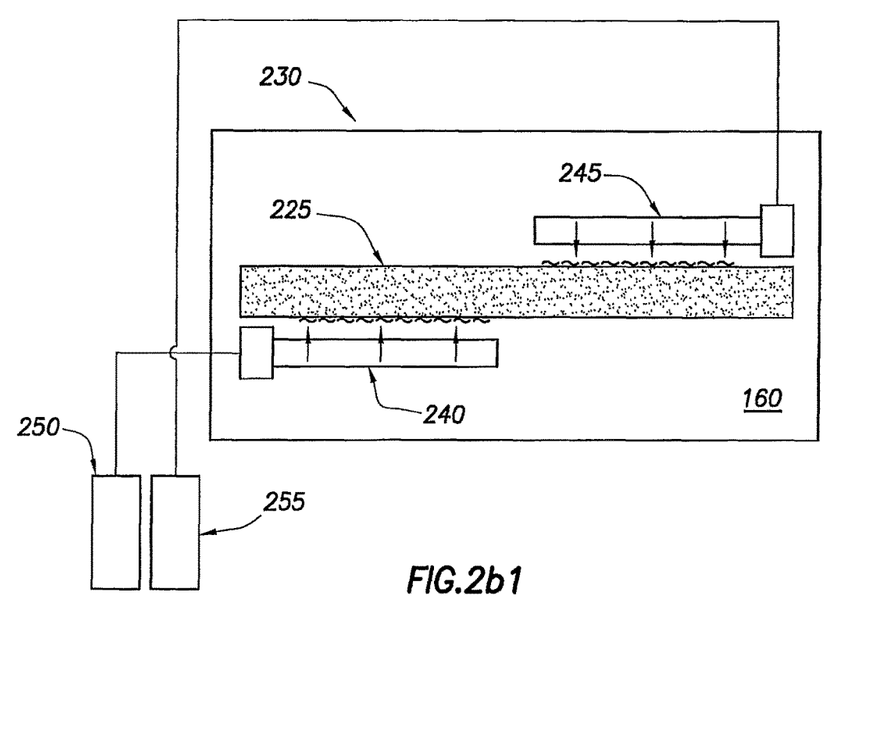
FIG. 2b is an illustrative ultrasonic bath for ultrasonicating a plugged or dirty filter cartridge.
Figure 2B:
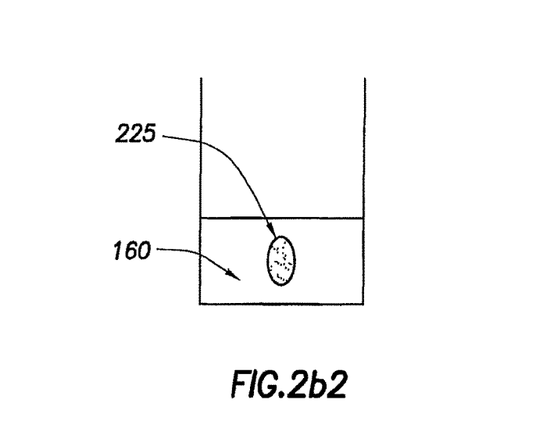

An apparatus for cleaning plugged or dirty filter cartridges using steam-ultrasonic technique is shown in FIGS. 2a and 2b. As shown in FIG. 2a, a filter cartridge 225 is clamped on the support and held at an angle for steam cleaning on the apparatus for steam-ultrasonic techniques 100. The angle in which the filter cartridge 225 is clamped onto the apparatus for steam-ultrasonic techniques 100 ensures that contaminates from the steam blasting technique are washed away. The angle can range anywhere between 10° to 40°, 15° to 45° or even 20° to 30°. The steam basting technique dislodges fine particles from the pore structure of the filter cartridge. Steam and condensate 145 are sprayed out of the steam blast setup 105. The steam blasting technique can be applied to the filter element for as little time or as much time as needed, such as about 10 to 20 minutes. The amount of steam applied to the filter element can vary from 50 psig, 75 psig, 100 psig, 125 psig or even 150 psig. There is no lower limit or upper limit of steam that can be applied, but instead depends on the durability and the how dirty the filter element is. Different processes can also occur during the steaming of the filter element including backflushing of the filter element and backpurging of the filter element.

As illustrated in FIG. 1a, the filter coupon 150 is blasted with steam so as to dislodge the fine particles from the pores of the filter 150. By removing the particles and clearing the pores, the resistance (k) of the filter element 150 is decreased. The resistance k (dp/acfm/sq.ft.) is defined as the differential pressure (dp) across the filter element 150 per volume of air supplied (acfm) per unit area (sq.ft.) of the element. The resistance k is typically calculated for the filter element 150 before and after cleaning so as to provide a measurement to track the extent of plugging in a filter 150. The value of k is proportional to the extent of plugging of the filter 150, and a specific reduction in k is equivalent to a specific amount of regained filter activity. Accordingly, the greater the value of k, the greater the plugging of the filter 150, and a percentage decrease in k is equivalent to the same percentage of filter activity regained. Additionally, resistance k may be represented as a ratio (i.e., relative resistance) when comparing the resistance of two or more filters. In accordance with the present disclosure, relative resistance is typically expressed when comparing the resistance of a cleaned filter to the resistance of a new filter, but may also be used to express a comparison of a cleaned filter to a dirty or plugged filter.

Although steam blasting is described in the present application, it should be understood that the steam method may include other methods of cleaning using steam and condensate that include, for example, steam backflush. Further, the steam method may also include a backpurge with compressed air.

Figure 3A:
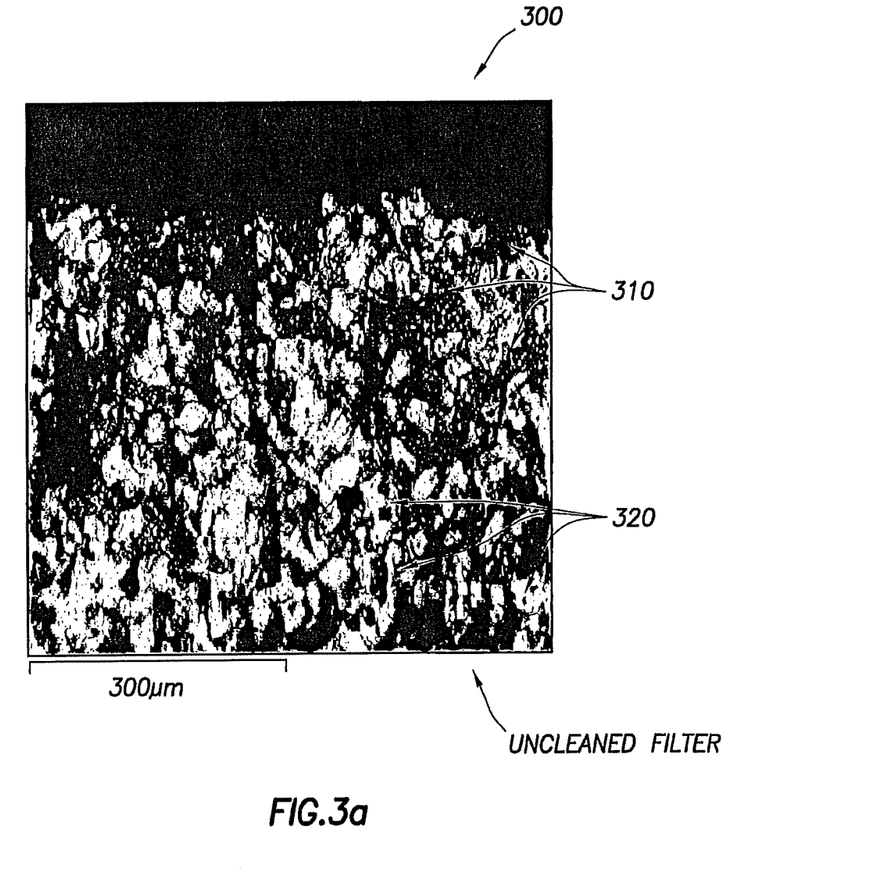
FIG. 3a is a scanning electron micrograph (SEM) of a cross-section of a plugged or dirty filter coupon.

FIG. 3a shows a scanning electron micrograph (SEM) of a cross section of a plugged or dirty filter coupon 150, wherein the resistance k of an exemplary new filter is 0.28 dp/acfm/sq.ft. and wherein the resistance k of the plugged or dirty filter is 8.05 dp/acfm/sq.ft. The uncleaned SEM 300 illustrates a large amount of fine particles 310 plugging the pores of the filter material 320.

Figure 3B:
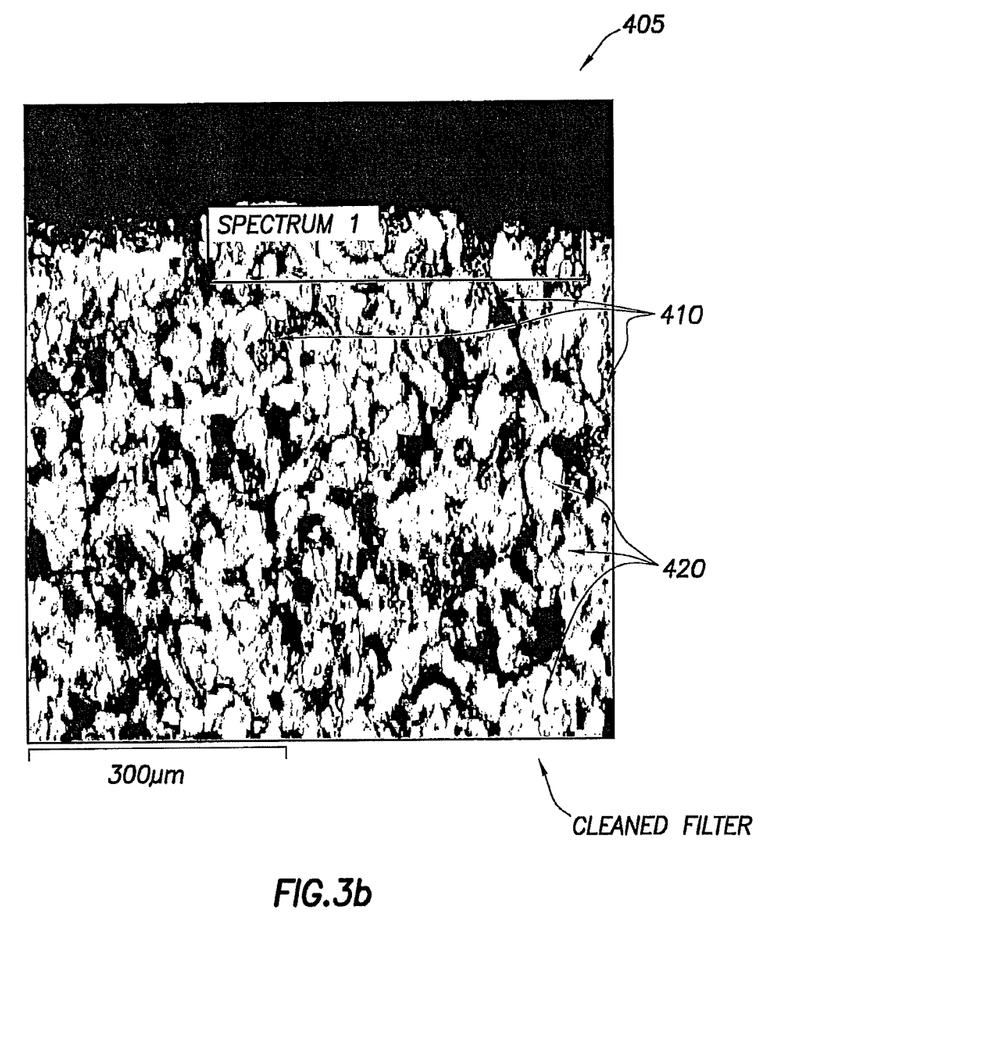
FIG. 3b is a scanning electron micrograph (SEM) of a cross-section of a cleaned filter coupon, showing the effects of steam on a plugged or dirty filter.

Using the apparatus 100 and the steam blast setup 105, the plugged or dirty filter coupon 150 was cleaned using 100 psig steam blasting. As shown in FIG. 3b, after steam blasting the filter 150 at 100 psi for 10 minutes, the cleaned SEM 405 illustrates significantly fewer particles 410 within the pores of the filter material 420, and the resistance k of the cleaned filter coupon 150 is 0.42 dp/acfm/sq.ft. The relative resistance of the cleaned filter to the new filter may be calculated to be 1.5 (i.e., 0.42/0.28). Accordingly, the steaming process by itself, as described above, results in an approximately 94.8% decrease in resistance k (i.e., (1−0.42/8.05)×100), and thus, 94.8% recovery of filter activity.

After the steaming process is completed, the filter coupon 150 or filter cartridge 225 may be dried in accordance with any method well-known in the art, such as, for example, air drying in an oven. The drying process may also include use of electric or gas heaters, and/or dehumidifiers.

The plugged or dirty filter coupon 150 may also be cleaned using an ultrasonic process (also known as ultrasonication or sonication). FIG. 1b shows an ultrasonic bath 155, wherein the plugged or dirty filter coupon 150 is submerged from 0.5 to 2 inches or even 1-1.5 inches below the surface in a solution 160 at ambient temperature and pressure, wherein the solution 160 may be water or an aqueous water based solution, a weak acid or even a solvent such as toluene. The submerged filter coupon 150 is then sonicated for a period of time by transducers 165, 170, 175 and 180, also submerged in the solution 160. In an embodiment, the transducers 165, 170, 175 and 180 are operated such that the transducers sonicate the solution 160 for about 15 to 90 minutes by producing ultrasound waves at a range about 40-70 Hz or 50 to 60 Hz. The ultrasonic process dislodges fine particles from the pores of the filter coupon 150, thereby decreasing the resistance k of the filter 150.

Alternatively, the plugged or dirty filter cartridge 225 may also be cleaned using ultrasonic techniques. FIG. 2b shows a top view and a side view of an ultrasonic bath 230 for cleaning plugged or dirty filter cartridges 225, wherein the plugged or dirty filter cartridge 225 is submerged about 1-1.5 inches below the surface in a solution 160 at ambient temperature and pressure, wherein the solution 160 may be an aqueous solution or a solvent, as described above. The submerged filter cartridge 225 is then sonicated for a period of time by transducers 240 and 245, also submerged in the solution 160. In an embodiment, the transducers 240 and 245 are operated by control boxes 250 and 255, respectively, such that the transducers sonicate the solution 310 for about 15 minutes by producing ultrasound waves at approximately 50-60 Hz. The ultrasonic process dislodges fine particles from the pores of the filter cartridge 225, thereby decreasing the resistance k of the filter 225.

Although aqueous solutions (i.e., water-based) are disclosed in embodiments of the present invention, it should be understood that solvents such as, for example, toluene, may be used without departing from the scope of the invention as set forth and defined in the claims attached hereto.

Figure 4A:
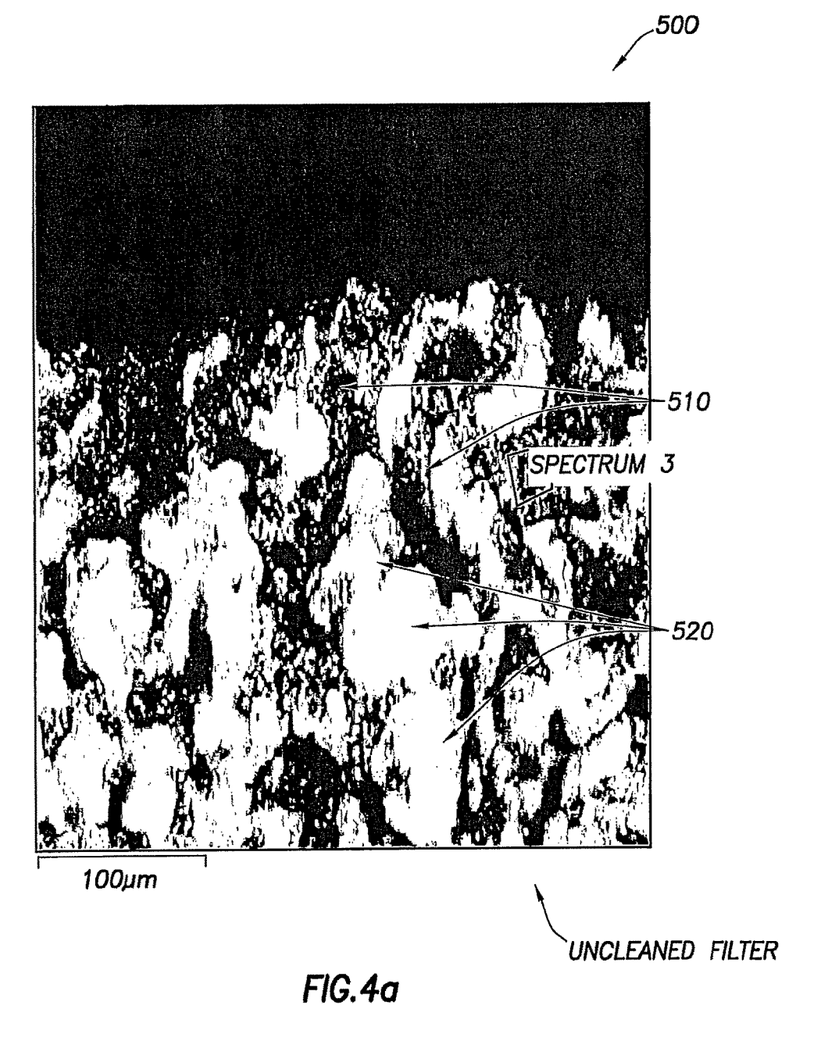
FIG. 4a is a scanning electron micrograph (SEM) of a cross-section of a plugged or dirty filter coupon.
Figure 4B:
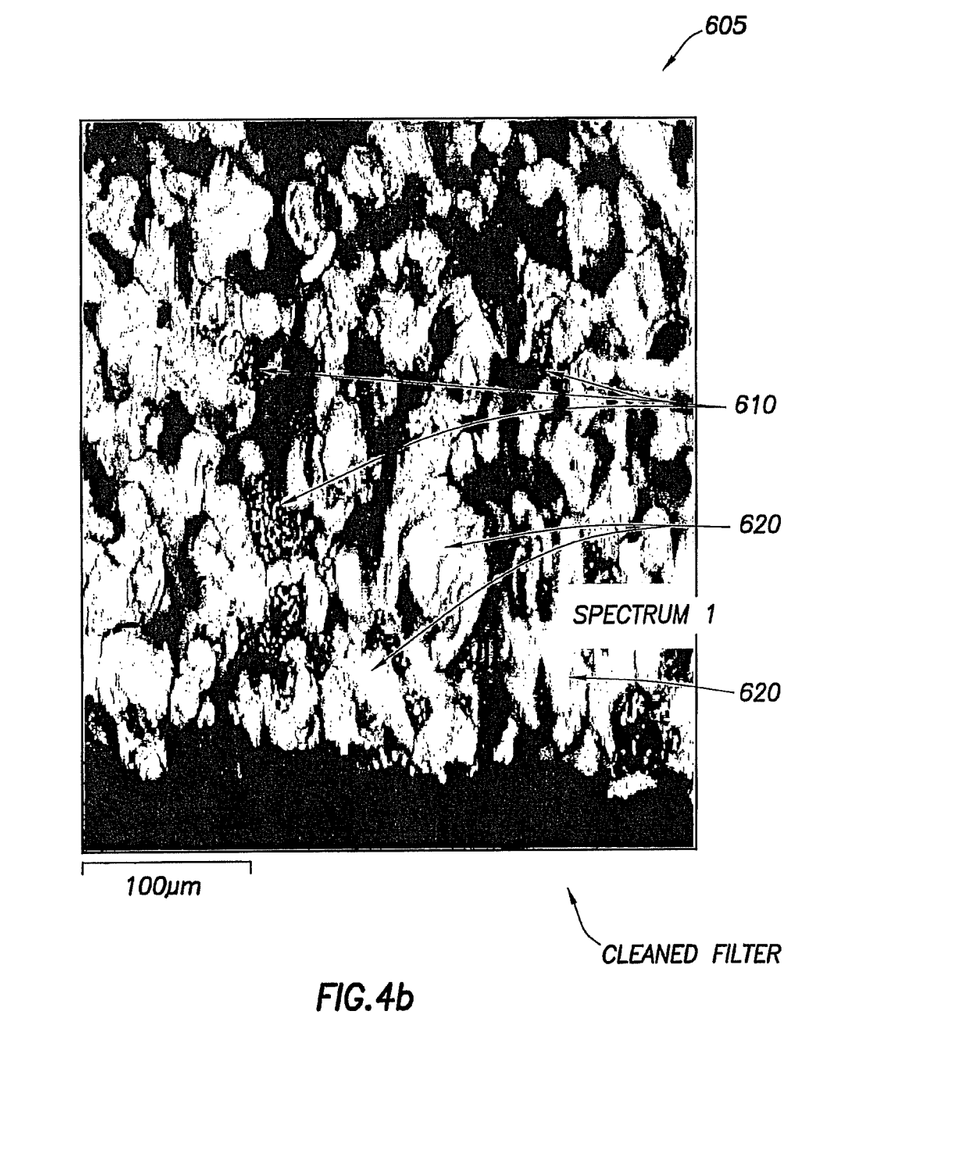
FIG. 4b is a scanning electron micrograph (SEM) of a cross-section of a filter coupon, showing the effects of ultrasonication on a plugged or dirty filter coupon.

FIG. 4a provides the SEM of a cross section of a plugged or dirty filter 150 illustrating the effects of ultrasonication on a dirty or plugged filter, wherein the resistance k of a new filter coupon is 0.28 dp/acfm/sq.ft., and the resistance k of the plugged or dirty filter coupon 150 is 8.38 dp/acfm/sq.ft. The uncleaned SEM 500 illustrates a large amount of fine particles 510 plugging the pores of the filter material 520. The plugged or dirty filter coupon 150 is submerged about 1-1.5 inches below the surface in water at ambient temperature and pressure. After ultrasonicating the plugged or dirty filter coupon 150 with ultrasound waves as shown in FIG. 4b. the cleaned SEM 605 illustrates significantly fewer particles 610 within the filter material 620, and the resistance k of the cleaned filter 150 is measured at approximately 2.17 dp/acfm/sq.ft. The relative resistance of the cleaned filter to the new filter may be calculated to be 7.75 (i.e., 2.17/0.28). Accordingly, the ultrasonic process by itself, as described above, results in an approximately 74.1% decrease (i.e., $(1-2.17/8.38) \times 100$) in resistance k, and thus, a 74.1% recovery of filter activity.

Figure 5:
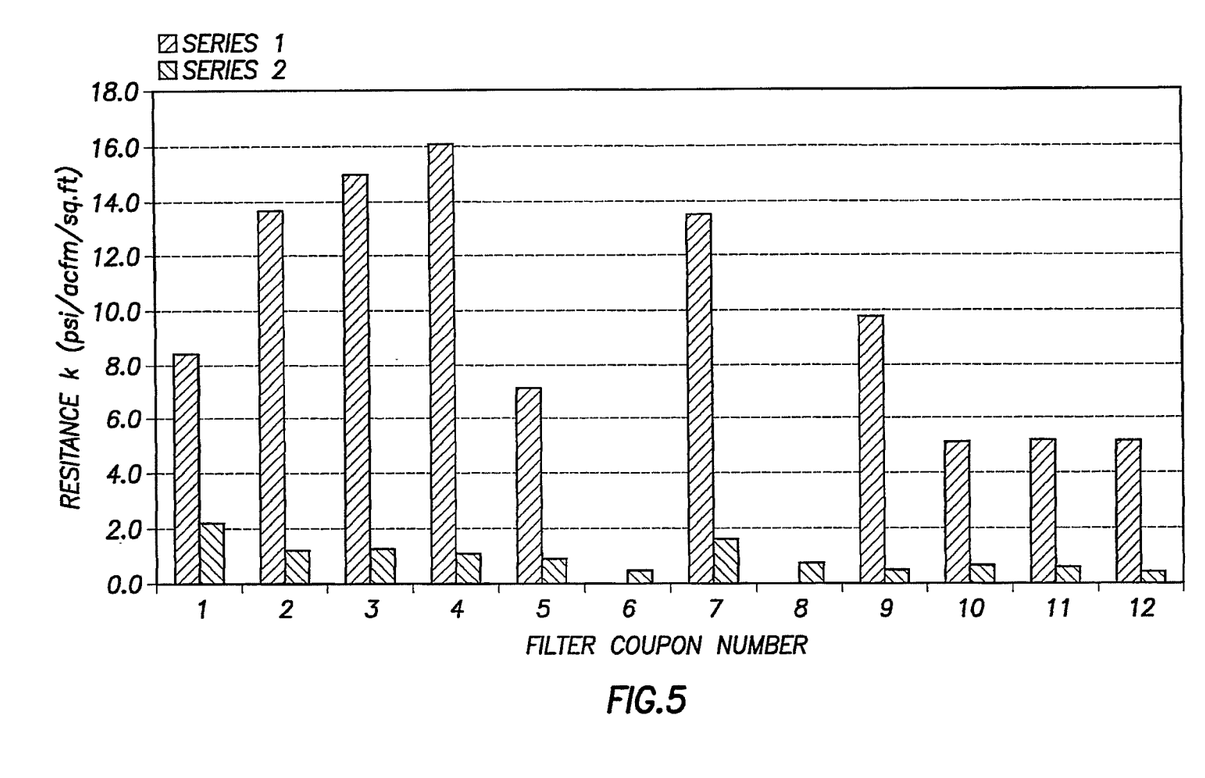
FIG. 5 is a graphical depiction of the effects of multiple cleaning techniques on a plugged or dirty filter coupon.
Figure 6:
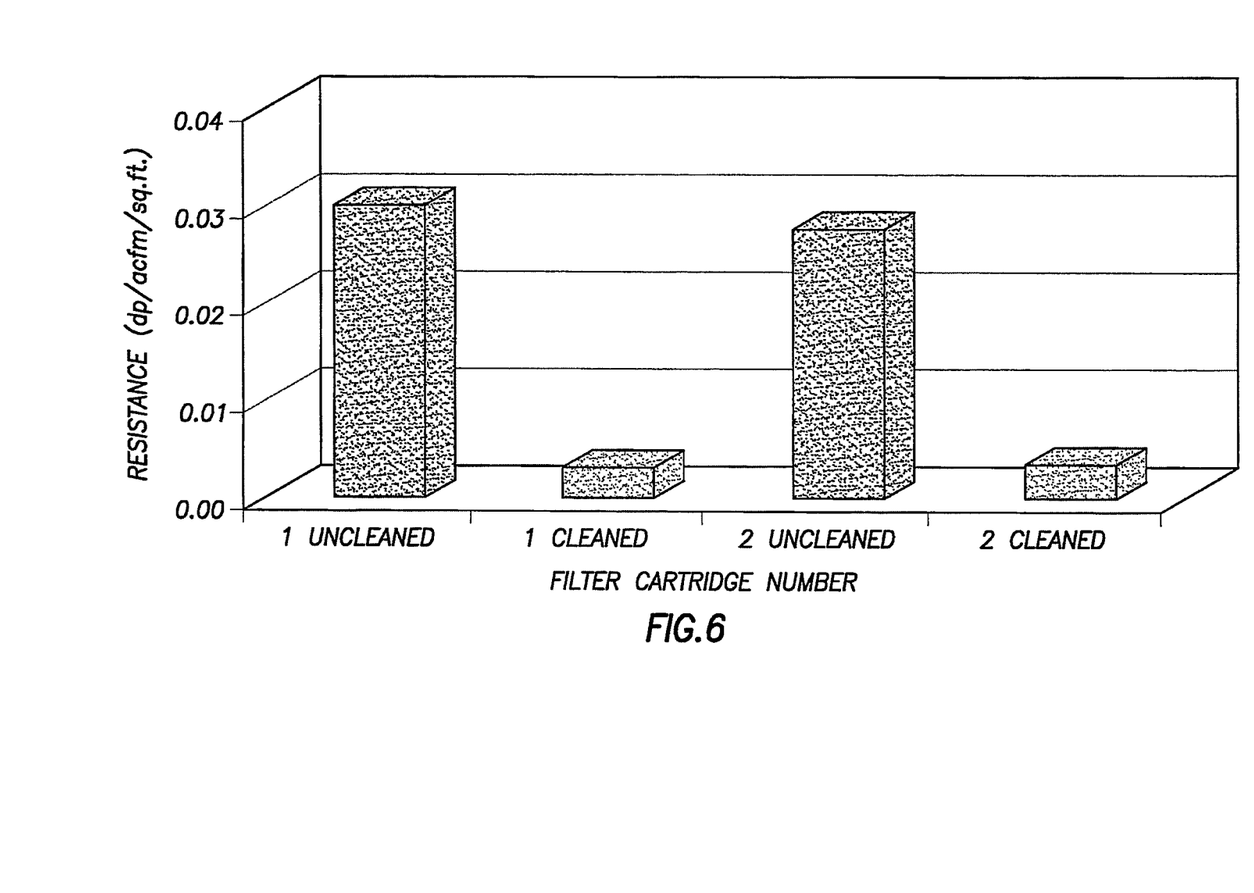
FIG. 6 is a graphical depiction of the effects of ultrasonication on a plugged or dirty filter cartridge.

Although the results of ultrasonication of plugged or dirty filters provides some recovery of filter activity, combining the steam and ultrasonic processes significantly improves the results as illustrated in FIGS. 5 and 6. Table 1 corresponds to the chart illustrated in FIG. 5, and provides resistance data for various steaming, soaking and sonicating methods of cleaning a filter coupon, wherein the cleaning methods may include one or more of the steaming, ultrasonicating, and/or soaking techniques. FIG. 5 and Table 1 are provided to show the decrease in resistance k for the methods of cleaning plugged or dirty filter coupons having varying resistance values. Additionally, Table 1 provides the relative resistance of the cleaned filter coupons compared to the resistance k of a new filter, wherein the resistance of a new filter is 0.28 pd/acfm/sq.ft. According to the resistance data provided in Table 1 and FIG. 5, the combined steam-ultrasonic methods provide results comparable to the conventional processes (e.g., Pall Procedure) that use harsh chemicals (e.g., strong acids and/or bases) and/or conditions (e.g., 50 to 75° C.).

TABLE 1

Resistance Data for Various Steaming, Soaking and Ultrasonicating Methods

| Coupon No. | Cleaning Processes | Cleaning Procedures | % Decrease in k $(1 - k_{clean}/k_{dirty}) \times 100$) | Relative k $(k_{clean}/k_{new})$ |
|---|---|---|---|---|
| 1 | Ultrasonic | Sonicated in water for 15 min. | 74.1 | 7.74 |
| 2 | Ultrasonic | Sonicated in water for 40 min. | 90.9 | 4.48 |
| 3 | Ultrasonic | Sonicated in 9.1 wt % Citric Acid in water solution for 45 min; and sonicated in water for 15 min. | 91.9 | 4.35 |
| 4 | Ultrasonic | Soaked in 22 wt % Citric Acid in water solution at 50° C. for 90 min.; and sonicated in water for 15 min. | 93.4 | 3.79 |
| 5 | Ultrasonic | Sonicated in 10 wt % Citric Acid in water solution for 30 min. | 87.1 | 3.35 |
| 6 | Ultrasonic | Sonicated in 10 wt % Citric Acid in water solution for 30 min.; and sonicated in 10 wt % Sodium Hydroxide in water solution for 30 min. | 93.7 | 1.63 |
| 7 | Steam-Soak-Steam | Steam blasted for 20 min.; soaked in 10 wt % Citric Acid in water solution for 1 hr.; rinsed with water; and steam blasted for 15 min. | 87.8 | 5.87 |
| 8 | Steam-Soak-Steam-Ultrasonic | Steam blasted for 20 min.; soaked in 10 wt % Citric Acid in water solution for 1 hr.; rinsed with water; steam blasted for 15 min.; and sonicated in water for 15 min. | 94.0 | 2.91 |
| 9 | Ultrasonic | Sonicated in 10% Tartaric Acid in water solution for 90 min.; sonicated in 10% Sodium Hydroxide in water solution for 90 min.; and sonicated in water for 15 min. | 95.0 | 1.72 |
| 10 | Steam | Steam blasted for 15-20 min. | 88.0 | 2.21 |
| 11 | Soak | Soaked in 10 wt % Citric Acid in water solution for 1 hr.; soaked in water for 15 min. | 89.3 | 1.98 |
| 12 | Steam | Steam blasted for 15-20 min. | 90.7 | 1.72 |

The combined steam-ultrasonic method disclosed in the present application provides a significant improvement over the steam or the ultrasonic processes by themselves. Conventional steam cleaning processes are unable to effectively dislodge the fine particulates that can clog the dirty porous filter elements. Conventional ultrasonic processes are unable to effectively dislodge the larger particulates that can coat and clog the dirty porous filter elements.

Figure 7:
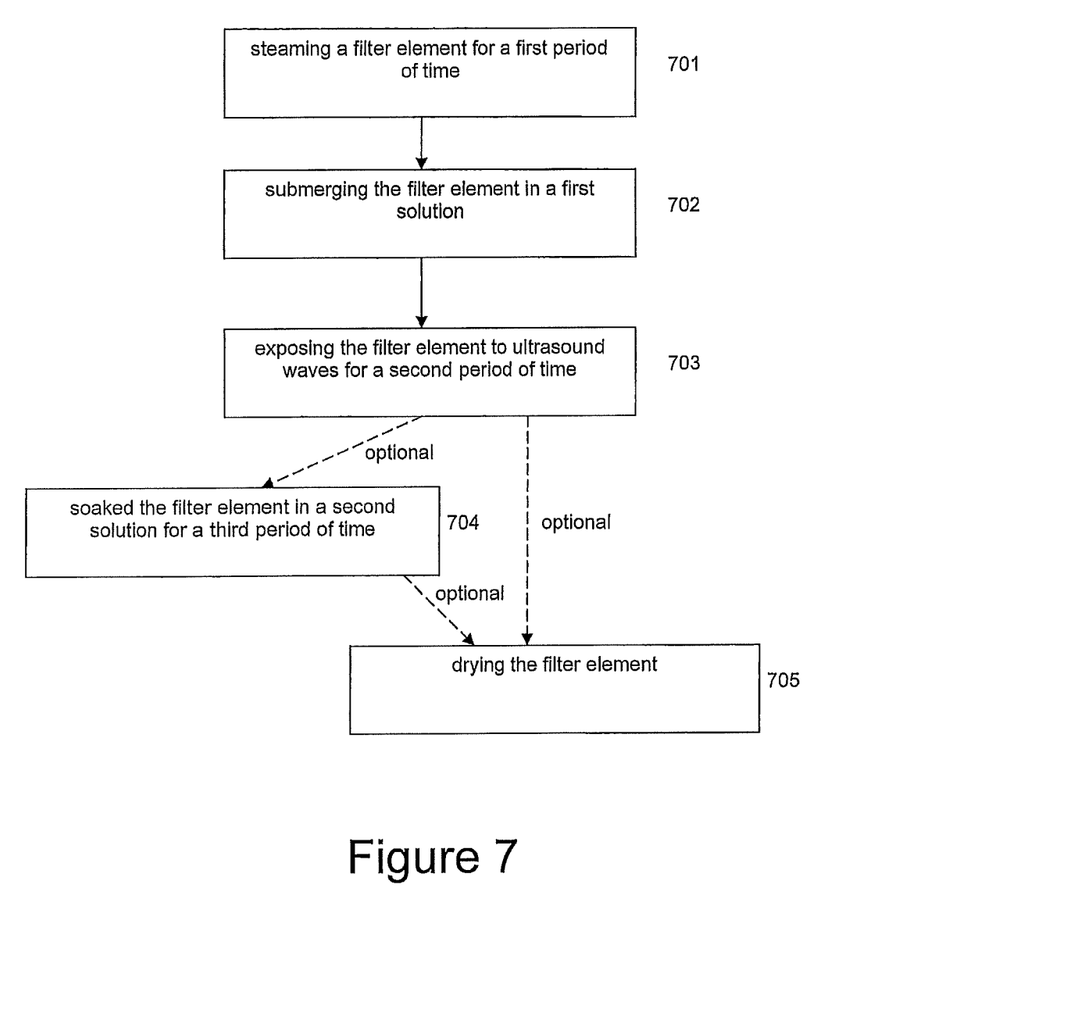
FIG. 7 is a flow chart describing the method of cleaning plugged or dirty porous metallic filter elements to regain filter activity.

FIG. 7 depicts a flow chart of how the method of cleaning plugged or dirty porous metallic filter elements can be performed to regain filter activity. The first step would involve steaming a filter element for a first period of time 701. After the steaming is done the next step would involve submerging the filter element in a first solution 702. The filter element is then exposed to ultrasound waves for a second period of time 703. Optionally the filter element can then be soaked in a second solution for a third period of time 704. Optional step 704 can be done in either a more acidic, basic or neutral solution than performed in step 703. The length of time in which the filter element will be soaked can be similar to the length of time spent in step 703, from 5 minutes to 0.5 hours to 1 hour to even 2 hours. The last optional step can follow either step 703 or 704 which will involve drying the filter element. The filter element can be dried in any device capable of drying the filter element; these include using an oven, a dehumidifier, a heater or combinations thereof. When drying the filter element can be heated to a temperature needed to dry the filter element, this temperature can vary depending on the solution used in either step 703 or 704, a typical temperature range would be about 80° C. to 120° C. or 100° C. to 150° C. The time frame for drying the element is any amount of time necessary to dry the filter element from about 15 minutes to 30 minutes to 1 hour to 2 hours to 3 hours.

Due to the significant costs associated with replacing damaged filters, it is much more economical, and therefore, desirable, to use the combined steam-ultrasonic method over conventional methods to clean them. Accordingly, the steam-ultrasonic method provides a safe and effective process for cleaning porous metallic filters while avoiding the use of harsh chemicals (e.g., strong acids and/or bases) such that a high percentage of filter activity is restored while maintaining structural integrity of the filter.

Definitions

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone: A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

What is claimed is:

1. A method for cleaning plugged or dirty porous sintered metal filter coupon to regain filter activity comprising the following steps in sequence:
   i. arranging a filter coupon to be held at an angle between 10° to 40° from horizontal;
   ii. steaming said filter coupon for a first period of time by blasting about 100 psig steam against the filter coupon in a back flushing orientation for about 10 to 20 minutes so as to dislodge fine particles from pores within the filter coupon;
   iii. drying the filter coupon for about three hours with a device selected from the group consisting of: an oven, a dehumidifier, a heater or combinations thereof and where the filter coupon is heated to about 150° C.;
   iv. submerging the filter coupon in a first solution at a depth of about 1 to 1.5 inches below the surface of the first solution wherein the first solution comprises at least water and citric acid;
   v. exposing the filter coupon to ultrasound waves within the first solution for a second period of time of about 15 to 90 minutes wherein the ultrasound waves are applied to the filter coupon at a range of about 50 to 60 Hz; and
   vi. soaking the filter coupon in a second solution for a third period of time being about one hour wherein the second solution is about 10 wt % citric acid in water.

2. The method of claim 1, wherein the activity of the cleaned filter coupon regains about 90% of its original activity.

3. The method of claim 1, wherein the activity of the cleaned filter coupon regains about 94% of its original activity.

4. The method of claim 1, wherein the plugged or dirty porous metallic filter coupons occur from liquid or gaseous hydrocarbon streams.

* * * * *